United States Patent

[11] 3,590,867

| [72] | Inventors | George M. Tam |
| | | St. Joseph, Mich.; |
| | | Franklin O. Wisman, Chambersburg, Pa. |
| [21] | Appl. No. | 787,416 |
| [22] | Filed | Dec. 27, 1968 |
| [45] | Patented | July 6, 1971 |
| [73] | Assignee | The Bendix Corporation |

[54] ELECTROHYDRAULIC CONTROL MEANS
17 Claims, 6 Drawing Figs.

[52] U.S. Cl. .................................................. 137/568, 303/10, 303/20
[51] Int. Cl. ...................................................... F04b 11/00, B60t 13/14
[50] Field of Search ........................................... 137/568, 565; 303/7, 20, 15, 10

[56] References Cited
UNITED STATES PATENTS

| 523,436 | 7/1894 | Lombard | 303/10 |
| 1,663,647 | 3/1928 | Brush | 303/10 X |
| 1,682,308 | 8/1928 | Schaede | 303/10 |
| 2,192,714 | 3/1940 | Norman et al. | 303/20 X |
| 2,330,739 | 9/1943 | Piron | 303/10 X |
| 3,503,656 | 3/1970 | Shattock et al. | 303/20 X |
| 3,507,541 | 4/1970 | Ayers | 303/7 |

Primary Examiner—M. Cary Nelson
Assistant Examiner—R. B. Rothman
Attorneys—Plante, Arens, Hartz, Hix and Smith and Richard G. Geib ABSTRACT: This invention relates to an electrohydraulic system having a controller means which can be regulated to provide a substantially level current for controlling a hydraulic pressure boost and metering valve apparatus which controller is adapted to be manually and hydraulically operated. In addition, the invention also relates to the integration of a hydraulic fluid supply, pump, accumulator and metering valve in a common housing.

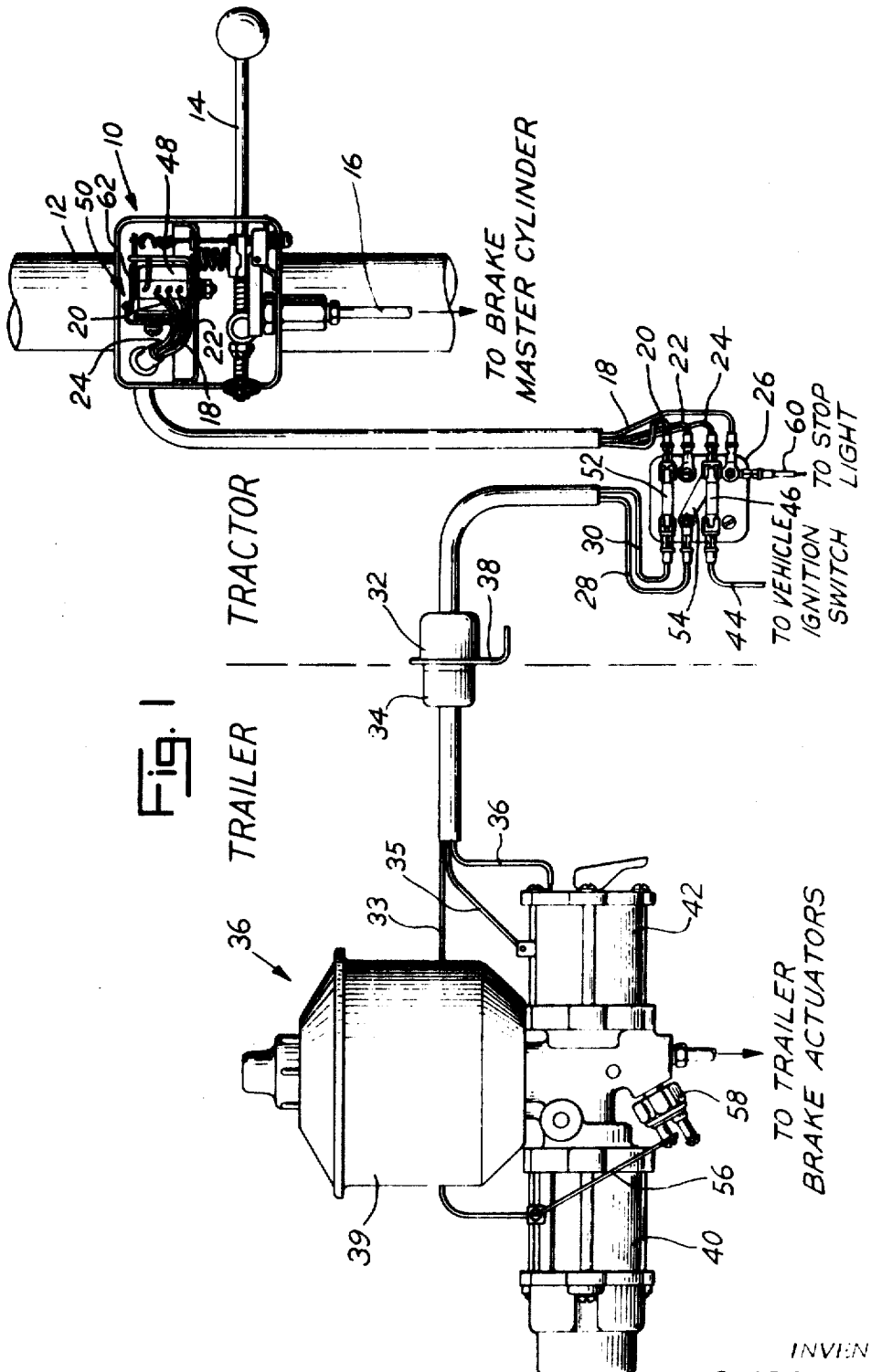

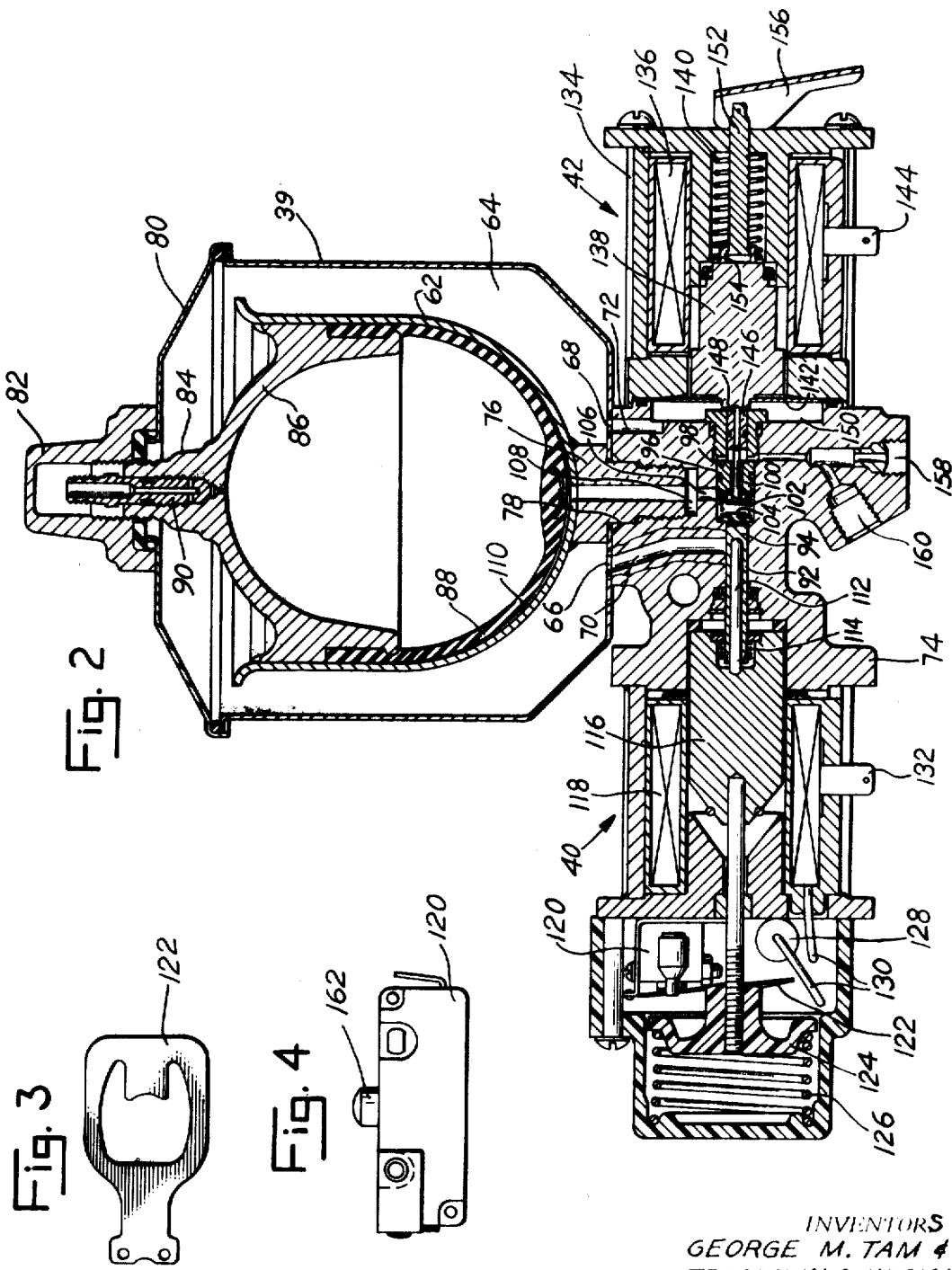

PATENTED JUL 6 1971 3,590,867

INVENTORS
GEORGE M. TAM &
BY FRANKLIN O. WISMAN

Richard G. Geib
ATTORNEY

ELECTROHYDRAULIC CONTROL MEANS

SUMMARY

For many years now it has been desired to provide a completely integrated hydraulic pressure control system in a trailer unit of the tractor-trailer type of vehicle. This invention relates simply to the meeting of this need. However, it should not be construed that this is the only application for the invention for it may well be utilized in hydraulic presses, hydraulic systems for aircraft, etc.

In that there is a specific utilization in mind, it will be readily appreciated by those skilled in the art that an object of this invention is to control hydraulic brakes with a trailer with only electrical connections between the tractor and the trailer.

Another object is to provide for application of the trailer brakes when a trailer separates from its tractor, that is readily available as a parking-brake system for the combination while the tractor's ignition is off.

A further object is to provide an electrical circuitry which is self-monitoring so that any electrical defect will cause immediate, automatic brake application.

A still further object of this invention is to provide a hydraulic pressure source and control means having a common housing for a hydraulic reservoir, a hydraulic accumulator, a self-regulating solenoid pump and a metering valve controllable electrically or manually by a controller in the former case which is itself provided with a dual-operating means.

Although there are several trailer-braking devices being marketed today, it is believed many advantages could be realized if a trailer-braking system such as proposed by this invention is provided to be controlled and operated by means of electrical connections only between the towing vehicle and trailer. Some of the primary advantages of such are:

1. No hydraulic, air or vacuum connections need be made between towing vehicle and trailer.
2. Electrical control brakes will provide a pressure source mounted in a convenient location on the trailer and allows use of a conventional hydraulic system for the trailer.
3. Positive trailer brake application is assured in case of trailer-towing vehicle separation.
4. Trailer-parking brake is automatically applied when towing-vehicle ignition is off.
5. Trailer brake pressure can be modulated either through a hydraulic interlock with a towing-vehicle brake system or by a separate hand control mounted on the steering column.

DESCRIPTION

Other objects and advantages of this invention will become readily apparent to those skilled in the art from the following description of the drawings in which:

FIG. 1 is a view of a system incorporating components in accordance with the principles of this invention and more particularly a hand controller having hydraulic means operated by a tractor master cylinder located between an electrical source and a self-contained hydraulic pressure control means in the trailer to which it is connected by electrical connections;

FIG. 2 is a cross-sectional view of a self-contained hydraulic pressure control means shown in FIG. 1;

FIG. 3 is a view of the spring control means of the solenoid pump section of the hydraulic pressure control of FIG. 2;

FIG. 4 is a view of a switching means actuated by the spring control means;

Figure 5:
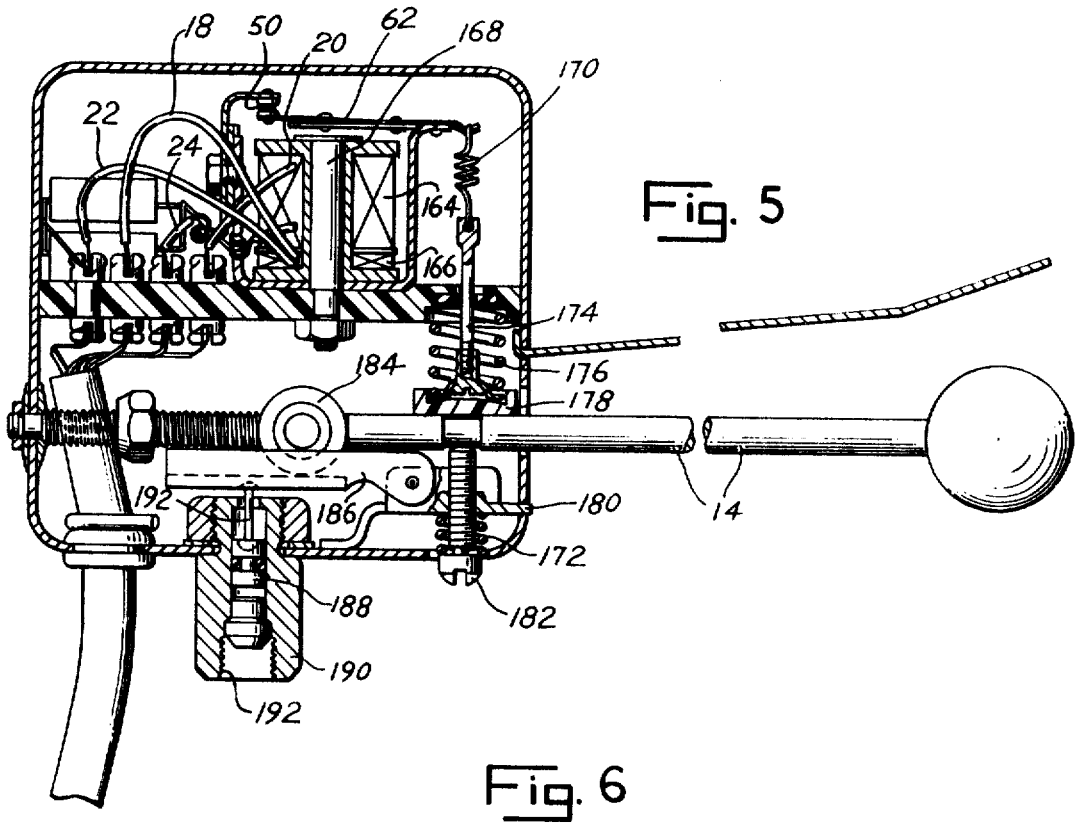
FIG. 5 is an enlarged cross-sectional view of the trailer brake control means attached to the steering column of the tractor.

With reference now to FIG. 1 there is shown the intentional elements of the system disclosed by this invention inclusive of a current regulating device 10 mounted on a steering column 12 of a vehicle and controlled by a hand lever 14 or by means of a hydraulic pressure from a master cylinder (not shown) for the tractor brake system delivered thereto by a conduit 16. This control is connected by means of electrical leads 18, 20, 22, and 24 to a fuse block 26 from which electrical leads 28 and 30 are forwarded to a female connector 32 adapted to receive male connector 34 from the trailer portion of the vehicle. The connector 34 has means to connect electrical lead 36 of the trailer to bracket 38 to provide common ground between the tractor-trailer portions of the vehicle and joins leads 28 and 30 with electrical leads 33 and 35. Leads 33 and 35 are in turn connected to an integrated hydraulic pressure control inclusive of a reservoir 39, a solenoid pump 40 and a metering-control valve 42 with an accumulator means within the reservoir 39 (see FIG. 2).

Before passing on to the detailed description of the components, it should be noted that fuse box 26 receives electrical current via lead 44 from the vehicle ignition switch that passes via fuse 46 to electrical lead 24 to energize a coil 48 whenever the ignition switch is closed. Coil 48 generates a regulated average current via points 50 into lead 20 that is connected by a fuse 52 to lead 30 with which lead 35 is in common, via connection of connector elements 32 and 34. A conductive strip 54 joins the right end of fuse 46, as viewed in FIG. 1, to connection for lead 28 that is in common with lead 33 of the trailer portion of the vehicle via the connecting elements 32, 34 to provide electrical current to solenoid pump 40, and via a lead 56 to one side of a normally open stoplight switch 58 controlling stoplight means on the trailer portion of the vehicle. As indicated in FIG. 1, lead 18 from the control means 10 is connected to lead 60 of the towing-vehicle brake light line to provide advance control for the solenoid control valve 42 as the tractor or towing-vehicle brakes are actuated.

It should be appreciated that current flowing via points 50 to the solenoid control valve 42 is regulated by the positioning armature 62 by the same phenomenon customarily employed in automobile generator control, and is sufficiently well known by those skilled in the art as to require no further detailed description. The elements of the control 10 will be further described with reference to FIGS. 5 and 6 hereinafter.

With reference now to FIG. 2, the control means 36 is shown to comprise reservoir housing 39 within which an accumulator shell 62 is located to prescribe an annular reservoir cavity 64 for hydraulic fluid. Openings 66 and 68 in the bottom of the housing 38 communicate cavity 64 with passages 70 and 72 in an intermediate housing 74 thereunder. Accumulator shell 62 is provided with a fitting 76 welded thereto that is threaded within a port 78 of the housing 76 between the ports 66 and 68 of the housing 38. The reservoir is closed by means of cover 80 that is held to the housing 38 by means of a cap 82 being threaded to an upwardly extending boss 84 of the endcap 86 for the accumulator mounting bladder 88 therewithin. A gas valve 90 is provided for the boss 84 to charge the interior of bladder 88 with nitrogen or some suitable gas prior to the assembly of cap 82 thereover.

Intermediate housing portion 74 is provided with a stepped bore having a small diameter portion 92 for receiving a pump piston 94 normally underlying and closing passage 70 thereof. A larger portion 96 of the stepped bore is adapted to mount a valve sleeve 98 within which a three-way valve element 100 is reciprocally arranged to prescribe a pressure discharge chamber 102 for pump piston 94. Chamber 102 is normally closed from communication with the bore in which the piston 94 is reciprocable by a pressure responsive valve 104. In addition, chamber 102 is open by a radial passage 106 to a chamber 108 open to chamber 110 between the shell 62 and bladder 88 within the accumulator.

The pump piston 94 is counterbored to receive a rod 112, and is provided with a spring means 114 at its left end connecting it with a core 116. A solenoid coil 118 for core 116 is utilized and controlled by a switch means 120. A spring lever 122 is provided for operating-switch means 120. A head 124 is provided on the core 116 to close switch means 120 via lever 122 when moved to the right by a spring 126. In other words, whenever coil 118 is deenergized, spring 126 moves the piston 94 to the right until it reaches the end of its stroke, being in the position shown whereby switch 120 will actuate coil 118 to retract core 116 and piston 94 to a position where switch means 120 opens to start the pump cycle over again.

In a preferred form a condenser 128 is provided in the electrical circuitry to the switch 120 to minimize electrical arcing within switch 120. Capacitor 128 is between coil 118 and switch 120 and connected thereto by electrical leads 130 such that, upon closing the contacts in switch 120 by the spring leaf 122, the electrical circuit via lead 33 (see FIG. 1) connected to terminal 132 is completed through the coil and switch to the ground provided by the housing which is connected to the ground wire 36.

At the other end of the intermediate structure 74 a solenoid housing 134 is provided having an electrical coil 136 controlling the positioning of a core 138 that is normally biased to the left by means of a spring 140 and centered radially by means of a spring steel diaphragm 142. Coil 136 has a terminal 144 that is connected to lead 35 (see FIG. 1), and another lead (not shown) connected to the housing to complete the electrical circuit, as by lead 36. Thus, in the normal condition whereby solenoid coil 136 is not energized, core 138 abuts on an annular sleeve 146 forming a part of the three-way valve element 100. Slots 148 are provided in the abutting face of core 138 so that the central opening in sleeve 146 is open to a chamber 150 that is communicable to passage 72 leading to port 68 for reservoir cavity 64.

A link 152 is interposed by means of a hat-shaped spring retainer 154 between the spring 140 and core 138. A manual lever 156 is connected to link 152 so that core 138 may be retracted manually whenever desired to permit the closure of the three-way valve preventing communication between pressure discharge chamber 102 and pressure discharge port 158 in the intermediate housing section 74. Further retraction of core 138 will permit the opening of the passage in sleeve 146 to the discharge port 158 whereby fluid may be readily returned to reservoir cavity 64 against the low pressure prevailing therein via chamber 150, passage 72 and port 68, while at the same time discharge chamber 102 is closed from communication with port 158. An additional port 160 is provided in housing section 74 to permit the connection therewith of the stoplight switch 58 (see FIG. 1).

Spring leaf 122 is more particularly illustrated in FIG. 3 and switch 120 is illustrated in FIG. 4 to clearly show button 162 which is operable by the movement of spring leaf 122 as a result of the impingement thereon of head 124.

With reference now to FIG. 5, the controller 10 of FIG. 1 is more particularly illustrated to show coils 164 and 166 about a core 168 for operating armature 62. Armature 62 is biased to a position whereby contacts 50 are normally closed by means of springs 170 and 176, the former of which is connected to a rod 174 biased downwardly by a spring 176 to abut an insulator-type bearing plate 178 on hand control lever 14, and the latter of which is reactive between a plate 180 and an adjusting screw 182 bearing also upon hand control lever 14.

Hand control lever is provided with an adjustable fulcrum 184 riding in a channel of a lever 186 pivoted to the pivotal plate 180. A piston 188 within a hydraulic cylinder 190 has a rod 192 projecting therefrom to bear upon lever 186. Cylinder 190 has a threaded port 192 to which conduit 16 (see FIG. 1) is connected to communicate hydraulic pressure from the master cylinder within the tractor vehicle.

Figure 6:
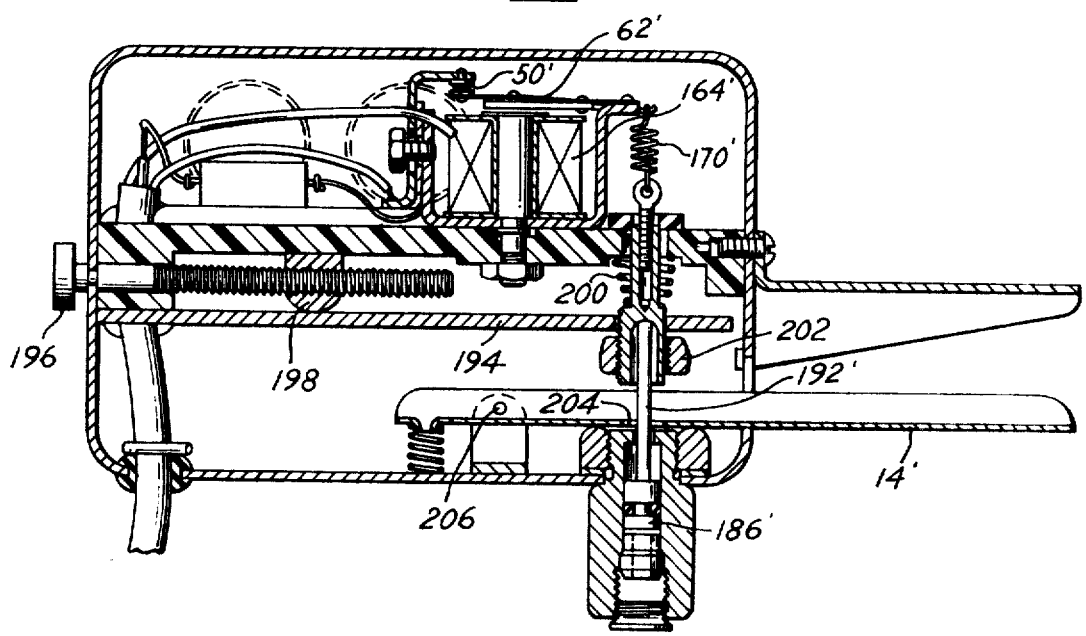
FIG. 6 is a cross-sectional view of a modified control means.

FIG. 6 illustrates a controller which represents an improvement over the controller of FIG. 5 by the utilization of a cantilever beam 194 whose spring rate may be adjusted by means of thumbscrew 196 moving fulcrum slide 198. Other changes from the controller of FIG. 5 involve the use of a conical spring 200 for opposing the relief of tension in spring 170' controlling the bias on armature 62' regulating the position of contacts 50', and the elimination of advance coil 166 plus other refinements readily obvious.

OPERATION

In operation, whenever the operator of the tractor portion of the tractor-trailer vehicle has depressed his brake pedal (not shown) to provide brake pressure to the tractor brakes, the tractor brake light electrical lead is energized to create an electromagnetic field in coil 166 to relax the effect on armature 62 of spring 170. The current flowing in coil 164 will then be balanced against the efforts of springs 170 and 176, and the armature 62 will vibrate at a periodicity determined by the spring forces, trailer-metering valve conductance, discharge resistance, etc. As stated before, this is the same phenomenon customarily employed in automobile generator controls, and is sufficiently well known by those skilled in the art as to require no detail description. Adjustment of the force of spring 172 as by the adjusting screw 182 will permit adjustment of the regulated average current applied to the metering valve at this time with the driver's foot resting on the brake pedal but without significant tractor brake line pressure. It is well known that application of this "advance" pressure is highly beneficial in keeping the vehicle train stretched out and ready for development of progressively more effective braking. In other words, in this condition the coil 136 just slightly reduces the effect of the magnetic field on core 138 so that limited braking pressure is delivered via three-way valve 100 to the discharge port 158 for utilization by the trailer brake actuators.

It will be appreciated by those skilled in the art that at all times when the tractor ignition switch is closed that the pump solenoid 40 is capable of operating to retract piston 94 to open passage 70 to a pumping chamber provided by bore 92 between the piston 94 and valve 104 until spring lever 122 opens switch 120 to eliminate the magnetic field on core 116. Thereafter, spring 126 will return piston 94 to pressurize hydraulic fluid and open valve 104 to deliver same to the high-pressure portion of the system including discharge chamber 102 and accumulator chamber 110. Whenever the pressure in the accumulator chamber 110 has reached a predetermined value, the pressure on the end of pump piston 94 will prevent spring 126 from moving piston 94 to the end of its travel. Thus, spring lever 122 will not operate button 162 to close switch 120, and pumping is stopped.

As the driver begins to develop tractor brake line pressure, the piston 188 applies effort to the manual control lever 14 to stress spring 176 causing the armature 62 to stabilize at a lesser value of current, thereby increasing the trailer brake application by further deenergizing coil 136 to permit further opening of three-way valve 100 communicating more hydraulic pressure via port 158 to the trailer brakes.

Adjustable fulcrum 184 permits a proportioning adjustment between the tractor brake pressure and the desired trailer brake pressure; whereas the inherent operation of the vibrating regulator proposed will cause the current applied to the trailer metering valve coil 136 to be independent of ordinary battery voltage variations and circuit resistance variations as a consequence of temperature change. In fact, the value of metering valve current and consequently trailer brake pressure will be uniquely determined by the net spring loading applied by springs 170 and 176.

It should also be noted at this time that the vibrator action inherently causes the current applied to the metering valve coil 136 to follow a sawtooth pattern when the controller is vibrating with the current fluctuating cyclically between an upper and lower value. By suitable proportioning of the circuit parameters, the magnitude of the current excursion from its average value can be selected to reach or slightly exceed the normal metering-valve hysteresis. This "dithering" effect will very materially improve and sensitize the response resulting in the trailer brake pressure faithfully and sensitively following variation in tractor brake pressure.

With reference to the controller of FIG. 6, it can be readily seen that the "advance" features permitted by the controller of FIG. 5 are not present. However, certain improvements in the operation should be noted in that, after initial movement of piston 186', further piston travel must react against a load which builds up at a rate much greater than that experienced during initial travel. The secondary rate is selective so as to permit any desired spring tension with a given input hydraulic pressure. A minimum of friction is possible in this system. In short then, what is provided, is a dual rate spring which primary rate is low and whose secondary rate is high and variable. Referring now to FIG. 6 initial travel of piston 186' is opposed by spring 200. Said travel relieves tension in spring 170' and brings a nut 202 in contact with cantilever beam 194. Continued travel of piston 186' is opposed by conical spring 200 and beam 194 whose rate may be varied without changing its initial position by adjusting fulcrum slide 198 to the right or to the left. As in the controller of FIG. 5, manual override of the hydraulic actuation is provided by means of lever 14' in that piston rod 192' acts through an aperture 204 in the manual control handle 14' thereby permitting independent hydraulic operation without parasitic friction of pivot 206 and mass load of handle 14' in contrast to carrying these elements along under hydraulic actuation of the controller of FIG. 5.

It should also be noted in closing that this invention deals with the problem of centering of the core 138 without increasing drag on the core and resulting in its erratic movement under control of solenoid coil 136. This articular improvement comes as a result of the employment of thin metallic diaphragm 142 fastened rigidly to the moving coil core 138 and piloted around the diaphragm periphery so as to accurately center the plunger within the central coil opening. The thinness of the diaphragm does not perhaps show in the drawing the fact that its periphery is held in sandwich style, being compressed between housing 74 and body 134 for coil 136. It has been found with this structure that a movement of 0.010 inches either side of the neutral position can be attained using less than 2 percent of the total plunger force available thus resulting in smooth modulation of plunger motion. The forces involved of course are dictated by physical dimensions making up the diaphragm and electromagnet.

In addition, the design provides that effective seal can be attained by using a solid disc for the diaphragm and that extremely small radial air gap can be maintained around the plunger by placing a thin shim around its outside diameter during installation and removing the shim after securing the diaphragm in place. The reduced air gap then results in higher efficiency.

Finally, any failure in the electrical system will automatically place the pump piston 94 in its extreme right position closing the radial port passage 70 for the pumping chamber and will open the three-way valve element 100 to communicate pressure discharge chamber 102 to pressure discharge port 158 to immediately apply the trailer brakes. Gradual movement of the vehicle after such a condition has occurred, can be permitted by the manual lever 156 which could be mechanically linked to the cab of the tractor portion of the vehicle, if desired.

We claim:

1. A hydraulic control means comprising:
a fluid reservoir;
an accumulator;
a housing connected to said reservoir and to said accumulator, said housing having separate passages from the reservoir and accumulator to a bore within said housing having a discharge port;
valve means in said bore controlling communication of said discharge port with said separate passages to connect said discharge port in one position of said valve means to said reservoir and in another position to said accumulator;
pump means in said bore having a pumping cylinder open to said reservoir and said accumulator with a pressure responsive discharge valve interposed between the pumping cylinder and the accumulator;
operator-operated means connected to said valve means for the actuation thereof to terminate communication of said reservoir with said discharge port and open said accumulator to the discharge port thereafter; and drive means connected to said pump means to maintain a predetermined fluid pressure for said accumulator.

2. The structure of claim 1 wherein said operator-operated means comprises a solenoid means having a core biased to maintain said valve means in a position to, in absence of energization of the solenoid means, open said accumulator to said discharge port.

3. The structure of claim 2 wherein said core is supported by a spring steel diaphragm.

4. The structure of claim 3 wherein said core is provided with manual control means to oppose a biasing spring and close the valve means communication of said accumulator to said discharge port and thereafter open said discharge port to said reservoir.

5. The structure of claim 4 wherein said pump means comprises a variable pull solenoid whose core reciprocates a pump piston in the pumping cylinder to open said reservoir thereto when an electromagnetic device is energized by a switch means responsive to travel of said piston and whose core is biased by a spring means to travel the length of said pumping cylinder in absence of a flux field holding and pulling said core.

6. The structure of claim 2 wherein said core is provided with manual control means to oppose a biasing spring and close the valve means communication of said accumulator to said discharge port and thereafter open said discharge port to said reservoir.

7. The structure of claim 6 wherein said pump means comprises a variable pull solenoid whose core reciprocates a pump piston in the pumping cylinder to open said reservoir thereto when an electromagnetic device is energized by a switch means responsive to travel of said piston and whose core is biased by a spring means to travel the length of said pumping cylinder in absence of a flux field holding and pulling said core.

8. The structure of claim 1 wherein said pump means comprises a variable pull solenoid whose core reciprocates a pump piston in the pumping cylinder to open said reservoir thereto when an electromagnetic device is energized by a switch means responsive to travel of said piston and whose core is biased by a spring means to travel the length of said pumping cylinder in absence of a flux field holding and pulling said core.

9. The structure of claim 1 wherein said operator-operated means includes a hand lever for regulating current output of current generating means, which hand lever is operatively arranged with respect to override said hydraulic means that is linked to said current generating means for similar control thereof as said hand lever.

10. A hydraulic pressure boost and delivery means comprising:
a remote control means;
a source for hydraulic fluid including a reservoir and an accumulator, said reservoir and accumulator having separate hydraulic fluid ports;
a pump means connected to the reservoir and accumulator whereby a pump piston is ported at spaced locations to one of the ports and to the other of the ports which in the latter case is via a pressure responsive valve means between the piston and the accumulator in a discharge chamber;
said pump means including a solenoid means operatively connected to said piston and a switching means, said solenoid means being located so as to be energized simultaneously with the approach of maximum travel of said piston means to energize said solenoid means to retract said piston to a predetermined position to open said switching means whereupon a spring forces said piston to pump further pressure, said piston having an area exposed to hydraulic pressure requiring a predetermined hydraulic pressure before said spring is unable to move said piston at which predetermined hydraulic pressure said switching means cannot be operated;

a control valve means having valve elements interposed between said discharge chamber and a pressure delivery port which elements also control communication of said pressure delivery port and said reservoir;

means to automatically control the operation of said pump means; and means responsive to the remote control means for operating said control valve means.

11. The structure of claim 10 and further characterized in that said control valve means is controlled by a solenoid mechanism inclusive of a spring forcing said valve elements in opposition to said solenoid mechanism such that said pressure discharge chamber is open to said pressure delivery port when said solenoid mechanism is not energized.

12. The structure of claim 11 wherein a mechanical means is linked to said valve elements to operate same in opposition to said spring regardless of said solenoid mechanism.

13. A hydraulic fluid supply means comprising:

a housing defining a bore therewithin;

a piston slidably mounted in one end of said bore for pressurizing fluid therein;

a three-way valve means in the other end of said bore cooperating with said piston to define a chamber therebetween having an outlet port;

said chamber being communicated to a fluid reservoir and to an accumulator; and a pressure responsive valve in said chamber for permitting flow of fluid to said three-way valve means from the section of the bore between the piston and the pressure responsive valve when the pressure level in said section exceeds a predetermined level.

14. The structure of claim 13 and further comprising means carried on one end of said housing to operate said piston and another means carried on the other end of said housing to operate said three-way valve means, said another means cooperating with the wall of said bore to define a chamber communicated to said reservoir.

15. The structure of claim 14 wherein said means to operate said piston is an electrical solenoid means responsive to movement of the piston such that pressure between said pressure responsive valve and said piston of a predetermined value prevents operation of said solenoid means.

16. The structure of claim 14 wherein said another means is an electrical solenoid means including a core, a diaphragm slidably suspending said core, said core being operatively connected to said three-way valve means to operate the latter.

17. The structure of claim 16 and further comprising manual control means for said three-way valve operably connected to said core, and a spring biasing said core in the absence of a magnetic field in said solenoid means toward a position maintaining said three-way valve in a position wherein said chamber in said bore is open to a pressure discharge port of said housing.